March 25, 1930.   D. J. YOUNG   1,751,502

PROCESS OF MAKING UNCARBURETED WATER GAS

Filed July 6, 1925

*Fig. 1*

*Fig. 2*

Inventor
DANIEL J. YOUNG
By Munson H. Lane
Attorney

Patented Mar. 25, 1930

1,751,502

UNITED STATES PATENT OFFICE

DANIEL J. YOUNG, OF TACOMA, WASHINGTON, ASSIGNOR TO YOUNG-WHITWELL GAS PROCESS CO., OF TACOMA, WASHINGTON

PROCESS OF MAKING UNCARBURETED WATER GAS

Application filed July 6, 1925. Serial No. 41,733.

The invention relates to a backrun process of making uncarbureted or blue water gas. This application is a continuation in part of my application, Serial No. 570,207, filed June 22, 1922, in which I have described backrun methods of making combustible gas which may be either carbureted or uncarbureted water gas. The specific claims of the parent application are directed to the making of carbureted water gas, whereas the claims of the present case are directed to the making of uncarbureted or blue water gas, which is produced when no carbureting material is added, during either a forward or a back run.

I will describe the process primarily with reference to the usual three shell carbureted water gas plant set forth in the parent application. Such a plant consists of a single generator, a carburetor and a superheater with backrun connections. Obviously, however, where uncarbureted water gas is being produced the shells ordinarily designated as the carburetor and superheater function as primary and secondary heat interchangers, although, for the convenience of this description, the terms carburetor and superheater will be retained. The two heat interchangers may be combined into one, if desired, with the elimination of one shell.

This application is also a continuation in part of my application, Serial No. 752,104, filed November 25, 1924, the specific claims of which application are directed to a backrun process of making carbureted water gas, in which water is substituted for steam during the back or down run.

One of the objects of the invention is to simplify the making of water gas, and to utilize a larger portion of the heat than is utilized in ordinary water gas operation.

A further object of the invention is to provide a process for making water gas which may be carried out with but slight modification of existing apparatus.

In common with other water gas processes, the first step of my process consists in air blasting the fuel bed of a generator until it is brought to an incandescent state, at the same time storing a portion of the heat of the blast gases in checker work or other refractory material, which may be contained in a suitable chamber to which secondary air may be admitted for further combustion of the blast gases.

When the fuel bed has reached the proper stage of ignition and the checker work in the combustion chamber or heat regenerator is suitably heated, the air blast is discontinued, and steam or water is introduced into the combustion chamber or heat regenerator containing the heated checkerwork. Where water is employed it is thus transformed into steam, which is then passed over the heated checker brick and then through the incandescent fuel in the generator, combustible gas being withdrawn from the set preferably at the bottom of the generator.

The process may be carried out in many different forms of apparatus, the important features being an upright generator containing carbonaceous fuel, and a secondary combustion chamber in communication therewith and containing checkerwork or other refractory material.

The invention will be more clearly understood by reference to the accompanying drawings in which are shown two forms of apparatus in which the process may be conveniently carried out.

In the drawings:

Fig. 1 is a central vertical section of a three shell plant comprising the usual generator, carburetor and superheater, certain parts being in elevation, and Fig. 2 is a similar view showing a two shell set.

The plant as illustrated in Fig. 1 is the usual three shell carbureted water gas plant with back run connections, and consists of a water gas generator 1, a carburetor 2, and a superheater 3, these being of any standard or satisfactory type of construction. Obviously when making uncarbureted or blue water gas, as during a backrun, or whenever steam is supplied, and the carbureting step is omitted the shells 2 and 3 function as heat interchangers or regenerators. These are provided with the usual connections for the transfer of gas and air from one to the other. This comprises a pipe 4 connecting the upper parts of the generator and carburetor and containing therein a valve 40. A pipe 41 is also provided, connecting the generator beneath the grate 11. This also is provided with a valve 42. A pipe as 43 is provided connecting the chambers 20 and 30 contained at the bottom of the carburetor and superheater, respectively, with each other.

The upper part of the superheater is provided with the usual gas off-take connection, as 31, and also with a stack valve, as 32, which is opened for the discharge of the gases formed during the air blasting run. The above features are substantially standard in construction for a water gas plant. The carburetor is also provided with means for introducing oil or other suitable enriching hydrocarbons at its upper end, this being represented by a pipe, as 21, and a distributer as 22, which is placed just within the chamber of the carburetor. Obviously, where uncarbureted water gas is desired, the pipe 21 and distributer 22 remain functionless or may be omitted entirely in a new plant intended only for the manufacture of uncarbureted gas. As, however, it is frequently desirable to change from carbureted water gas manufacture to uncarbureted water gas manufacture using the same plant, this means for supplying hydrocarbons is generally retained for occasional use.

A steam pipe 6 is provided for supplying steam to the bottom of the generator and a like pipe 61 for supplying steam above the fuel bed of the generator. Valves 60 control each of these steam pipes. A gas off-take pipe 8 connects with the bottom of the generator.

Air is supplied beneath the fuel bed of the generator for use in blasting, through pipe 50 controlled by valve 51. Supplemental air supply pipe 52 connects with the upper part of carburetor and is controlled by valve 53. A supplemental air pipe 54 connects with the bottom of the superheater and is controlled by valve 55.

The parts above described, with the exception of the offtake pipe 8, are or may be of standard construction for illuminating gas plants, and when operated according to any process many of the above parts are functionless. For example, the oil supply device 22 is not used when blue water gas is being produced, but the plant as a whole is shown and the parts have been described for the purpose of illustration only.

Operating according to the usual practice, for a water gas plant, air is first introduced for a period beneath the grate 11, and passes up through the fuel bed 12 during the blasting process. Supplemental air is also introduced through pipe 52 to the carburetor and through pipe 54 to the superheater in order to completely burn any combustible matter in the blast gases. This supplemental air is controlled by valves 53 and 55. This blast gas would be passed over the pipe 4 to the carburetor, through the checkerwork 23 therein, taken through the pipe 43 to the superheater 3 and up through the checker work 33 therein and out through the stack valve 32.

In my process in common with the usual practice, the air blast may then be followed by a forward steam run steam being introduced through the pipe 6 or 61. This steam is passed through the incandescent fuel bed of the generator, whereby it is converted into water gas which may then be passed through the heat interchangers 2 and 3 and withdrawn from the set through pipe 31.

In carrying out my process, the blasting operation is preferably carried to a point where the checkerwork in both carburetor and superheater is raised to a somewhat higher temperature than would be required by the operation of the usual process.

The next step in my process consists in the introduction of steam or water, preferably in the form of a fine spray, into one of the combustion chambers containing the heated checkerwork. As shown in Fig. 1, the water is introduced through a pipe 62 to the top of the superheater. In this chamber, containing highly heated checkerwork, the water is at once converted into steam. This steam is passed in a reverse direction to that usually employed, passing first through the superheater 3, thence through the carburetor 2, and then finally through the incandescent fuel in the generator where it is broken up, the resultant gas being taken out at the point where air and steam would normally be introduced to the generator, in carrying out the usual water gas process, as by pipe 8. This steam absorbs heat from the superheater and the generator until it is highly superheated. When it reaches the generator it comes in contact with the coal or other fuel which is introduced thereto. This steam is sufficiently hot to volatilize some of the constituents of the coal and particularly so, if the coal be very finely reduced or powdered.

This step is known as the backrun, and may either follow or precede the forward run, the order of gas making cycles being variable as desired.

Any suitable and well known means for reversing the flow of gas through the entire plant may be employed. Ordinarily this result will be accomplished by the use of valves 34 and 70 which may be placed in the pipes 8 and 31 respectively, or, if desired, seal pots of any suitable construction may be used. Obviously by thus reversing the flow of gas through the plant as a whole the necessity for reversing the flow within the generator itself is avoided, and consequently the hot valve 40 of the usual gas set is rendered functionless or may be dispensed with entirely. The valve 40, pipe 41 and valve 42, which are parts of the old standard apparatus, are not essential to the operation of the present process, and may be eliminated, or may be employed in carrying out special cycles, when desired.

While I prefer to introduce water into the system at the top of the superheater through the pipe 62, I may, if desired, introduce water or steam at other parts of the system, as for example, at the bottom of the carburetor through pipe 72.

In Fig. 2 is shown a simplified form of apparatus similar to that shown in Fig. 1, but consisting of two shells only with the carburetor and certain parts of existing apparatus eliminated, which are unnecessary to the operation of my process. Parts of the apparatus which are the same as in Fig. 1 are similarly numbered.

The operation of the plant is the same. Blast air is admitted to the fuel bed of the water gas generator through the pipe 50, and the blasting continued until the fuel is thoroughly ignited, the blast gases being passed through the pipe 4 into the combustion chamber 3 containing checkerwork 33, or other refractory material. Secondary air is admitted through pipe 54 to insure combustion of the blast gases.

When the blasting operation is complete, the air is cut off at 50 and 54 and water or steam may be introduced into the top of the combustion chamber 3 through pipe 62. Where water is employed it is at once converted into steam and passes over the checkerwork 33 and through the fuel bed of the generator, water gas being withdrawn from the generator through the pipe 8.

A forward steam run may be employed either before or after the backrun as set forth above.

It has been found that by introducing water in place of steam, a material saving of heat is accomplished as well as the elimination of apparatus such as steam boilers, which would otherwise be used. The term aqueous fluid is used as a generic term to designate both water and steam.

In carrying out the process, any sort of solid fuel may be used, as coal, coke, peat, lignite, and the like, though coal is preferable.

Having thus described my invention, what I claim as new and desire to secure by Letters Patent is:—

1. A three cycle process of making uncarbureted water gas; one cycle consisting in air blasting the fuel bed of a single gas generator containing a bed of solid fuel and passing the resulting blast gases through a heat interchanger, whereby the heat interchanger is highly heated; a second cycle consisting in making a forward steam run successively through the generator and the heat interchanger, the gas being withdrawn from the end of the heat interchanger remote from the generator; and the third cycle consisting of a backrun, comprising introducing water into the end of the heat interchanger remote from the generator, whereby steam is produced, passing said steam successively through the heat interchanger and through the fuel bed of the generator, and withdrawing the water gas generated during the backrun directly from the gas generator, and passing it directly to a place of storage or use.

2. A three cycle process of making uncarbureted water gas; one cycle consisting in air blasting the fuel bed of a single gas generator containing a bed of solid fuel and passing the resulting blast gases through a heat interchanger, whereby the heat interchanger is highly heated, a second cycle consisting in making a forward steam run successively through the generator and the heat interchanger, the gas being withdrawn from the end of the heat interchanger remote from the generator, and the third cycle consisting of a backrun, comprising introducing aqueous fluid into the end of the heat interchanger remote from the generator, passing said aqueous fluid successively through the heat interchanger and through the fuel bed of the generator, and withdrawing the water gas generated during the backrun directly from the gas generator, and passing it directly to a place of storage or use.

In testimony whereof I affix my signature.

DANIEL J. YOUNG.